United States Patent [19]

Tanaglia et al.

[11] Patent Number: 5,374,695
[45] Date of Patent: Dec. 20, 1994

[54] PROCESS FOR THE PREPARATON OF ELASTOMERIC COPOLYMERS OF ETHYLENE

[75] Inventors: Tiziano Tanaglia, Bologna; Sergio Foschi, Ferrara, both of Italy

[73] Assignee: Enichem Elastomeri S.r.l., Milan, Italy

[21] Appl. No.: 912,089

[22] Filed: Jul. 9, 1992

[30] Foreign Application Priority Data

Nov. 25, 1991 [IT] Italy .......................... M191-A-003140

[51] Int. Cl.$^5$ ...................... C08F 4/642; C08F 210/16
[52] U.S. Cl. .................... 526/125; 526/142; 526/282; 526/336; 526/339; 526/905
[58] Field of Search ............... 526/125, 142, 212, 282, 526/336, 339

[56] References Cited

U.S. PATENT DOCUMENTS

| | | | |
|---|---|---|---|
| 3,642,746 | 2/1972 | Kashiwa et al. | 502/112 |
| 3,901,863 | 8/1975 | Berger et al. | 502/117 |
| 4,292,200 | 9/1981 | Berger et al. | 252/431 |
| 4,421,674 | 12/1983 | Invernizzi et al. | 526/125 |
| 4,843,049 | 6/1989 | Invernizzi et al. | 526/125 |
| 4,886,770 | 12/1989 | Cuffiani et al. | 526/125 X |

FOREIGN PATENT DOCUMENTS

| | | |
|---|---|---|
| 0243327 | 10/1987 | European Pat. Off. . |
| 0281524 | 9/1988 | European Pat. Off. . |
| 0522650 | 1/1993 | European Pat. Off. . |
| 1401708 | 7/1975 | United Kingdom . |

*Primary Examiner*—Fred Teskin
*Attorney, Agent, or Firm*—Rogers & Wells

[57] ABSTRACT

Process for the preparation of elastomeric copolymers of ethylene, wherein ethylene is copolymerized with an α-olefin, and possibly with a diene as termonomer, in the presence of a Ziegler-Natta catalyst including a solid component of catalyst based on titanium and aluminium, supported on magnesium chloride and obtained, in accordance with a special procedure, in the form of a spherical granular solid. This process produces elastomeric copolymers having a low crystallinity even with a high content of linked ethylene.

27 Claims, No Drawings

PROCESS FOR THE PREPARATON OF ELASTOMERIC COPOLYMERS OF ETHYLENE

The present invention relates to a process for the preparation of elastomeric copolymers of ethylene.

More specifically, the present invention relates to a process for the preparation of elastomeric copolymers of ethylene, wherein the ethylene is copolymerized with an α-olefin, and possibly with a diene, in the presence of a Ziegler-Natta catalyst including a solid component of catalyst based on titanium and aluminium, supported on magnesium chloride.

It is well-known in the art that for an ethylene/α-olefin copolymer to be considered as being elastomeric, the distribution of comonomers along the chain must be alternated as much as possible, to prevent the formation of long ethylenic sequences, which would cause an increase in the crystallinity and consequently a decrease in the elastic properties.

Moreover, to lower the degree of crystallinity, the polymeric material must have a narrow distribution of composition, to avoid the presence of fractions having a high content of ethylene.

It is also known that ethylene can be polymerized with α-olefins using a low pressure procedure on Ziegler-Natta catalysts. These catalysts are generally composed of a compound of transition elements belonging to groups IVb, Vb or VIb of the Periodic Table, mixed with an organometallic compound, or hydride, of the elements from groups I to III of the Periodic Table.

Solid components of Ziegler-Natta catalyst are known in the art, containing a transition metal (generally titanium), a bivalent metal (generally magnesium), a halogen (generally chlorine) and possibly also an electron donor. These solid components, combined with an organometallic compound of aluminium, form highly active catalysts in procedures for the (co)polymerization of ethylene carried out at low temperature and pressure.

U.S. Pat. No. 3,642,746, for example, describes a solid component of catalyst obtained by the contact of a compound of a transition metal with a halide of a bivalent metal treated with an electron donor. According to U.S. Pat. No. 4,421,674, a solid component of catalyst is obtained by the contact of a compound of a transition metal with the product of a spray-dried solution of magnesium chloride in ethanol. According to U.K. Patent 1,401,708, a solid component of catalyst is obtained by the interaction of a magnesium halide, a non-halogenated compound of a transition metal and an aluminium halide. U.S. Pat. Nos. 3,901,863 and 4,292,200 describe solid components of catalyst obtained by putting a non-halogenated magnesium compound in contact with a non-halogenated compound of a transition metal and an aluminium halide.

U.S. Pat. No. 4,843,049 describes a solid component of catalyst which contains titanium, magnesium, aluminium, chlorine and alkoxy groups, obtained by spray-drying an ethanol solution of magnesium chloride to obtain an active support, which is interacted in sequence with a titanium tetra-alkoxide and an alkyl aluminium chloride.

It has now been found, in accordance with the present invention, that it is possible to obtain, with high yields, elastomeric copolymers of ethylene with α-olefins, and possibly with a diene as termonomer, having a low crystallinity even with a high content of ethylene, by means of a copolymerization process using a Ziegler-Natta catalyst with a similar composition to that described in U.S. Pat. No. 4,843,049, prepared according to a special procedure, as described hereafter.

The present invention consequently relates to a process for the preparation of elastomeric copolymers of ethylene, wherein ethylene is copolymerized with an α-olefin, and possibly with a diene as termonomer, in the presence of a Ziegler-Natta catalyst including an aluminium trialkyl and a solid component of catalyst containing titanium, magnesium, chlorine and alkoxy groups, said solid component of catalyst being prepared according to the following procedure:

(i) a solid support and granular $MgCl_2$, obtained by spray drying an alcohol solution of $MgCl_2$ and having an alcohol hydroxyl content of 18 to 25% by weight, expressed as a weight of ethanol, is suspended in a liquid hydrocarbon solvent and an aliphatic alcohol $R'$—OH, wherein $R'$ is an alkyl radical, linear or branched, containing from 1 to 5 carbon atoms, and a titanium tetra-alkoxide $Ti(OR)_4$, wherein R is an alkyl radical, linear or branched, containing from 1 to 8 carbon atoms, are added to the suspension thus obtained, with a molar ratio $R'$—$OH/MgCl_2$ of 0.5:1 to 1.5:1 and with a molar ratio $MgCl_2/Ti(OR)_4$ of 0.3:1 to 3:1;

(ii) the suspension of step (i) is heated until a homogeneous solution is obtained and the solution is cooled to precipitate a granular solid;

(iii) the granular solid obtained in step (ii), in the relative suspension, is put in contact and interacted with an alkyl aluminium chloride having the formula $AlR''_nCl_{(3-n)}$, wherein $R''$ is an alkyl radical, linear or branched, containing from 1 to 20 carbon atoms, with a ratio between the chlorine atoms, in said aluminium chloride, and the total alkoxy groups of 0.4:1 to 1.2:1;

(iv) the solid component of catalyst is recovered from the reaction products of step (iii).

With respect to the preparation of the solid component of catalyst, the support of magnesium chloride, used in step (i) of the procedure, can be prepared according to the method known in the art, by dissolving anhydrous or basically anhydrous magnesium chloride in ethanol, and spray-drying the solution in a spray-drying apparatus. In particular the solution is sprayed with a nozzle or other equivalent device, in the evaporation chamber of a spray-drier and the liquid particles thus formed are put in contact with a flow of inert gas fed into the evaporation chamber in countercurrent or equicurrent. The procedure is usually carried out with a temperature of the gaseous flow at the inlet of about 250°–400° C., with a temperature of the gaseous flow at the outlet of 140°–250° C. and with a difference of temperature between the flows at the inlet and outlet of at least 40° C. Under these conditions it is possible to recover from the drier a solid in the form of particles, with an apparent density of 0.30–0.46 g/ml, a particle size of 1–100 μm (average size 10–20 μm), a surface area of 12–17 m²/g, total porosity of 65–85 volume % and content of alcohol hydroxyls of 18 to 25% by weight expressed as a weight of ethanol.

The support of magnesium chloride thus prepared is suspended in a liquid hydrocarbon solvent, for example, hexane, pentane, decane or dodecane, and a titanium tetra-alkoxide, which can be selected for example from titanium tetra n-propoxide, titanium tetra n-butoxide, titanium tetra i-propoxide and titanium tetra i-butoxide, is added to the solution thus obtained. The preferred compound is titanium tetra n-butoxide. An aliphatic alcohol, for example methanol ethanol, propanol, isopropanol, n-butanol and n-pentanol, is also added to the suspension. The preferred aliphatic alcohol is n-butanol. In the preferred method the molar ratio $R'-OH/MgCl_2$ is 1.5:1 and the molar ratio $MgCl_2/Ti(OR)_4$ is 1:1.

The suspension thus obtained is heated in step (ii) to temperatures of 80°–100° C., until a homogeneous solution is obtained and this solution is cooled, preferably gradually, to room temperature (20°–25° C.) or to a value close to room temperature to cause the formation of a solid precipitate. This precipitate is typically in granule form with a size generally ranging from 10 to 100 μm (average size 30–45 μm), with an apparent density of 0.45 to 0.50 g/ml, a surface area of 7–10 m²/g, porosity of 55–70 volume % and a content of alcohol hydroxyls of 60–65% by weight as $R'$—OH alcohol and 1–5% by weight as ethanol. It has been found that the alcohol is practically absent in the liquid phase of the suspension, the concentration being at values of a few parts per million.

An alkyl aluminium chloride, normally selected from aluminium diethyl monochloride, aluminium ethyl dichloride and aluminium ethyl sesquichloride, is added to the suspension obtained in step (ii), and the mixture is kept at a temperature ranging from room temperature (20°–25° C.) to 80° C., for a period of 30 to 120 minutes. In the preferred method in step (iii) the ratio between the chlorine atoms, in said alkyl aluminium chloride, and the total alkoxy groups is 0.65:1, the alkyl aluminium chloride, possibly diluted in a hydrocarbon solvent, is added to the suspension which is kept at a temperature of 30°–35° C. and the resulting suspension is then heated to 60° C. for 1 hour.

The solid component of catalyst is finally recovered from the reaction products of step (III), for example by filtration or decanting and is washed with a hydrocarbon solvent and possibly dried.

The solid component of catalyst thus obtained is a spherical granular solid, with a granule size generally ranging from 1 to 30 μm (average size 7–15 μm), a surface area of 10–20 m²/g, porosity of 65–85 volume %, apparent density of 0.4–0.5 g/ml, and with the following composition expressed in atomic proportions:

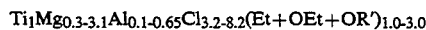

$$Ti_1Mg_{0.3-3.1}Al_{0.1-0.65}Cl_{3.2-8.2}(Et+OEt+OR')_{1.0-3.0}$$

wherein $R'$ is an alkyl radical, linear or branched, containing from 1 to 5 carbon atoms and preferably n-butyl.

The titanium present in the solid component of catalyst is partly in a trivalent form and partly in a tetravalent form with a ratio between trivalent titanium and the total titanium of 0.6:1 to 1:1.

The catalyst used in the process of the present invention is composed of the solid component of catalyst described above and an organometallic compound of aluminium, especially an aluminium trialkyl wherein the alkyl contains from 2 to 6 carbon atoms. The preferred aluminium trialkyl is aluminium tributyl. An atomic ratio between the aluminium and titanium of 5:1 to 400:1 is normally kept in the catalyst.

The α-olefins which can be used in the process of the present invention generally contain from 3 to 8 carbon atoms. Among these propylene and butene-1 are preferred. Propylene is particularly preferred.

Apart from ethylene/α-olefin copolymers, the process of the present invention can also be used to prepare ethylene/α-olefin/diene terpolymers, also having elastomeric properties. For this purpose, conjugated or non-conjugated dienes can be used as termonomers, of the cyclic or acyclic type, generally having from 4 to 12 carbon atoms, such as, for example, 5-ethylidene-2-norbornene, trans-1,4-hexadiene, 1,3-butadiene, etc. The content of terpolymer in the diene generally ranges from 1 to 20% by weight, preferably from 2 to 6% by weight.

The process is carried out in suspension, in a reaction medium in which the polymer produced is basically insoluble. The reaction medium is preferably prevalently composed of one of the comonomers, to which a saturated hydrocarbon is added as a diluent, or a mixture of different saturated hydrocarbons, in liquid form under the reaction conditions, having from 2 to 5 carbon atoms, such as ethane, propane, butane.

The polymerization temperature is kept, according to the process of the present invention, from 0° to 60° C., preferably from 25° to 55° C. The contact times vary from 15 minutes to 4 hours, preferably from 30 minutes to 1 hour. The polymerization is generally carried out in the presence of hydrogen as a molecular weight moderator and regulator, operating under a total pressure ranging from 5 to 50 bar, preferably from 8 to 30 bar, with a ratio between the ethylene pressure and the hydrogen pressure higher than 4 and preferably higher than 20.

The elastomeric copolymers obtained according to the process of the present invention generally contain from 35 to 85% by weight, preferably from 45 to 75% by weight, of ethylene.

The process of the present invention produces elastomeric copolymers of ethylene with α-olefins, as well as ethylene/α-olefin/diene terpolymers, having a low crystallinity even with a high content of linked ethylene. In fact a 3% crystallinity has been observed for copolymers with about 68% by weight of linked ethylene, which is considered as traces for copolymers having about 59% by weight of ethylene.

The process of the present invention is also characterized by particularly high productivity and yields compared to those of similar processes of the known art.

These and other advantages arising from the present invention will be better illustrated by the examples which follow which, however, do not limit the invention in any way.

The "crude" copolymers were characterized with the following parameters:

COMPOSITION AND PRODUCT OF THE REACTIVITY RATIOS OF THE COMONOMERS $r1*r2$: were determined by infra-red analysis. In particular the quantity of propylene is calculated on the basis of the ratio between the absorption intensities at 4390 and 4255 cm$^{-1}$; the product $r1*r2$ is determined on the basis of absorptions at 973 and 935 cm$^{-1}$.

MOLECULAR WEIGHT DISTRIBUTION (RATIO $M_w/M_n$): was determined by gel permeation chromatography, in 1,2-dichlorobenzene at 135° C., using 4 columns in series containing, as a stationary phase, PL-GEL ® (cross-linked styrene-divinylbenzene resin, produced by POLYMER LAB) with particles of 10 μm and porosity respectively 10², 10³, 10⁴, 10⁵ nm. The calculation of molecular weights was corrected in relation to the average composition of the copolymer according to the equation proposed by Sholte.

MOONEY ML(1+4) VISCOSITY: was determined at 100° and 125° C. both on the "crude" polymer and in mixture, according to the ASTM D1646-87 method.

The mixtures for vulcanization were prepared in an open mixer, with the following composition:
100 p/p of copolymer
5 p/p of zinc oxide
55 p/p of FEF carbon black
30 p/p of branched polyalkylbenzene oil
0.37 p/p of sulphur
5 p/p of Peroximon ® F-40 (1,3-bis-(terbutyl-peroxi-isopropyl)-benzene.

The vulcanization was carried out in a plate press at 165° C. for 40'. The traction tests (ultimate tensile strength and elongation to break) and the determination of the tension set of the vulcanized products were carried out in accordance with the method ASTM D412-87.

The X-ray crystallinity was determined using a difracto-meter for powders.

EXAMPLE 1

Preparation of the solid component of catalyst.

(i) An ethanol solution of magnesium chloride is spray-dried to prepare a solid support of catalyst in the form of spherical particles, with a particle size of 3 to 100 μm (average size 15 μm), having an apparent density of 0.30 g/ml, a surface area of 17 m²/g, a porosity of 75 volume %, and a content of alcohol hydroxyls of 22% by weight (expressed as ethanol). 2.45 g of this support are suspended in 50 ml of anhydrous n-decane in a 250 ml reactor, under stirring. 2.8 ml of n-butanol and 7 g of titanium tetra-n-butoxide are added to the suspension.

(ii) The suspension is heated to 100° C. for 60 minutes, operating under nitrogen. A limpid solution is obtained which is cooled to room temperature (20°–25° C.), with the precipitation of an inflated solid in the form of spherical particles, having a particle size of 10 to 100 μm (average size 35 μm), an apparent density of 0.5 g/ml, a surface area of 8 m²/g, porosity of 65 volume %, and content of alcohol hydroxyls of 60% by weight (expressed as butanol).

(iii) 19.7 g of aluminium ethyl sesquichloride dissolved in 50 ml of n-decane (ratio between the chlorine atoms of the aluminium ethyl sesquichloride and the total alkoxy groups (OEt+OBu)=0.65:1), are added dropwise to the suspension kept under stirring and at a temperature of 35° C. At the end of the addition the suspension is heated for 1 hour to 60° C.

(iv) The solid is filtered on a porous glass septum. 8 g of a solid component of catalyst are thus obtained, which are washed with 3 100 ml portions of n-decane.

The solid component of catalyst thus obtained has the following characteristics:
titanium content: 13.4% by weight, with a ratio between the titanium in its trivalent state and the total titanium (trivalent plus tetravalent) of 0.80:1;
magnesium content: 7.7% by weight;
aluminium content: 1.0% by weight;
chlorine content: 42.4% by weight;
content of organic fraction: 35.5% by weight; the organic fraction is basically composed of ethyl groups (Et), ethoxy groups (OEt) and n-butoxy groups (OBu).

Expressing the components according to their atomic proportions, the component of catalyst can be represented by the formula:

$$Ti_{1.1}Mg_{1.1}Al_{0.1}Cl_{4.2}(Et+OEt+OBu)_{1.57}$$

wherein OEt represents 3.7% and OBu 30.8% by weight of the total.

COPOLYMERIZATION OF ETHYLENE WITH PROPYLENE 440 g of liquid propylene are placed in a 1.7 cm³ perfectly anhydrous cylindrical autoclave equipped with a stirrer. The temperature of the autoclave is regulated at 50° C. It is then saturated with ethylene until an excess pressure of 4.5 bar is reached and then an excess pressure of 1.2 bar of hydrogen is added. The total pressure on the head of the autoclave is 25.0 bar.

7.4 mg of the solid component of catalyst prepared as described above and 5 mmoles of aluminium tributyl dissolved in 25 cm³ of anhydrous hexane are then introduced contemporaneously. The reaction is carried out at a constant temperature, and the ethylene fed continuously to keep the total pressure constant.

After one hour from the beginning of the reaction 142 g of copolymer are recovered, equal to a yield of 143200 g of product per g of titanium per hour.

The characteristics of the "crude" and vulcanized copolymer, prepared as described above, are shown in Table I.

EXAMPLE 2

445 g of liquid propylene are charged into a 1.7 dm³ perfectly anhydrous cylindrical autoclave equipped with a stirrer. The thermostat of the autoclave is fixed at 40° C. It is then saturated with ethylene until an excess pressure of 4 bar is reached and then an excess pressure of 0.3 bar of hydrogen is added. The total pressure on the head of the autoclave is 19.8 bar.

12 mg of the solid component of catalyst prepared as described in Example 1 and 5 mmoles of aluminium tributyl dissolved in 25 cm³ of anhydrous hexane are then introduced contemporaneously. The reaction is carried out using the same procedure as described in Example 1.

After an hour from the beginning of the reaction 160 g of copolymer are recovered, equal to a yield of 99500 g of product per g of titanium per hour.

The characteristics of the "crude" and vulcanized copolymer, prepared as described above, are shown in Table I.

EXAMPLE 3

450 g of liquid propylene are charged into a 1.7 dm³ perfectly anhydrous cylindrical autoclave equipped with a stirrer. The thermostat of the autoclave is regulated at 50° C. It is then saturated with ethylene until an excess pressure of 3.3 bar is reached and an excess pressure of 0.3 bar of hydrogen is then added. The total pressure on the head of the autoclave is 22.9 bar.

10.7 mg of the solid component of catalyst prepared as described in Example 1 and 5 mmoles of aluminium tributyl dissolved in 25 cm³ of anhydrous hexane are introduced contemporaneously. The reaction is carried out using the same procedure as described in Example 1.

After an hour from the beginning of the reaction 134 g of copolymer are recovered, equal to a yield of 93500 g of product per g of titanium per hour.

The characteristics of the "crude" and vulcanized copolymer, prepared as described above, are shown in Table I.

EXAMPLE 4

465 g of liquid propylene are charged into a 1.7 dm³ perfectly anhydrous cylindrical autoclave equipped with a stirrer. The thermostat of the autoclave is regulated at 40° C. It is then saturated with ethylene until an excess pressure of 2.5 bar is reached and then an excess pressure of 0.3 bar of hydrogen is added. The total pressure on the head of the autoclave is 18.2 bar.

15.4 mg of the solid component of catalyst prepared as described in Example 1 and 5 mmoles of aluminium tributyl dissolved in 25 cm³ of anhydrous hexane are then introduced contemporaneously. The reaction is carried out using the same procedure described in Example 1.

After an hour from the beginning of the reaction 134 g of copolymer are recovered, equal to a yield of 93500 g of product per g of titanium per hour.

The characteristics of the "crude" and vulcanized copolymer, prepared as described above, are shown in Table I.

EXAMPLE 5

840 g of liquid propylene are charged into a 2.8 dm³ perfectly anhydrous cylindrical autoclave equipped with a stirrer. The thermostat of the autoclave is regulated at 40° C. It is then saturated with ethylene until an excess pressure of 2.0 bar is reached and then an excess pressure of 0.3 bar of hydrogen is added. The total pressure on the head of the autoclave is 17.5 bar.

21.4 mg of the solid component of catalyst prepared as described in Example 1 and 5 mmoles of aluminium tributyl dissolved in 25 cm³ of anhydrous hexane are then introduced contemporaneously. The reaction is carried out using the same procedure described in Example 1.

After an hour from the beginning of the reaction 193 g of the copolymer are recovered, equal to a yield of 67300 g of product per g of titanium per hour.

The characteristics of the "crude" and vulcanized copolymer, prepared as described above, are described in Table I.

EXAMPLE 6

450 g of liquid propylene are charged into a 1.7 dm³ perfectly anhydrous cylindrical autoclave equipped with a stirrer. The thermostat of the autoclave is regulated at 40° C. It is then saturated with ethylene until an excess pressure of 3.0 bar is reached and an excess pressure of 0.3 bar of hydrogen are then added. The total pressure on the head of the autoclave is 18.7 bar.

12.9 mg of the solid component of catalyst prepared as described in Example 1 and 5 mmoles of aluminium tributyl dissolved in 25 cm³ of anhydrous hexane are then introduced contemporaneously. The reaction is carried out using the same procedure as described in Example 1.

After an hour from the beginning of the reaction 200 g of copolymer are recovered, equal to a yield of 115700 g of product per g of titanium per hour.

The characteristics of "crude" and vulcanized copolymer, prepared as described above, are shown in Table I.

TABLE I

| EX. | Crude copolymer | | | | | | | | Mixt. ML1 + 4 100° C. | Vulcaniz. polymer | | |
|---|---|---|---|---|---|---|---|---|---|---|---|---|
| | Composition | | $r_1 \cdot r_2$ | Intrin. viscos. (dl/g) | Mw/Mn | ML1 + 4 100° C. | ML1 + 4 125° C. | Cry sta (%) | | Ult. tens. stren. (kg/cm2) | Elong to break % | Tens. Set 200% |
| | C2H4 (w/w %) | C3H6 (w/w %) | | | | | | | | | | |
| 1 | 70.3 | 29.7 | 2.94 | 1.7 | 5.1 | 52 | 33 | — | 41 | 150 | 565 | 24 |
| 2 | 67.6 | 32.4 | 2.83 | 1.7 | 3.9 | — | 53.5 | 3 | 64 | 175 | 535 | 16 |
| 3 | 65.8 | 34.2 | 4.11 | 1.93 | 6.2 | 61 | 46.5 | — | 49.5 | 154 | 580 | 12 |
| 4 | 59.3 | 40.7 | 3.67 | 1.54 | 6.9 | 48 | — | traces | 42 | 149 | 600 | 8 |
| 5 | 57.6 | 42.4 | 4.11 | 1.66 | — | 58.5 | 39 | — | 36.5 | 101 | 530 | 8 |
| 6 | 56.8 | 43.2 | >5 | 0.92 | — | 22.5 | 18.5 | — | 18.5 | 89 | 560 | 12 |

We claim:

1. Process for the preparation of elastomeric copolymers of ethylene, wherein ethylene is copolymerized with an α-olefin, in the presence of a Ziegler-Natta catalyst including an aluminum trialkyl and a solid component of catalyst containing titanium, magnesium, aluminum, chlorine and alkoxy groups, said solid component of catalyst being prepared according to the following procedure:

(i) obtaining a solid, granular support of $MgCl_2$, by spray-drying an alcohol solution of $MgCl_2$ and having a content of alcohol hydroxyls of 18 to 25% by weight, expressed as a weight of ethanol, suspending said support in a liquid hydrocarbon solvent and adding an aliphatic alcohol R'—OH, wherein R' is a linear or branched alkyl radical, containing from 1 to 5 carbon atoms, to the suspension thus obtained, together with a titanium tetraalkoxide $Ti(OR)_4$, wherein R is a linear or branched alkyl radical, containing from 1 to 8 carbon atoms, with a molar ratio R'—OH/$MgCl_2$ of 0.5:1 to 1.5:1 and a molar ratio $MgCl_2$/$Ti(OR)_4$ of 0.3:1 to 3:1;

(ii) heating the suspension of step (i) until a homogeneous solution is obtained and cooling the solution to precipitate a granular solid;

(iii) contacting the granular solid obtained in step (ii), in the suspension, with an alkyl aluminum chloride selected from the group consisting of aluminum diethyl monochloride, aluminum ethyl dichloride and aluminum ethyl sesquichloride";

(iv) recovering the solid component of catalyst from the reaction products of step (iii).

2. Process according to claim 1, wherein the α-olefin contains from 3 to 8 carbon atoms.

3. Process according to claim 2, wherein the α-olefin is propylene.

4. Process according to claim 2, wherein the α-olefin is butene-1.

5. A process according to claim 1, wherein the ethylene is further copolymerized with a termonomer comprised of a diene.

6. Process according to claim 5, wherein the diene used as termonomer contains from 4 to 12 carbon atoms.

7. Process according to claim 6, wherein the diene is selected from 5-ethylidene-2-norbornene, trans-1,4-hexadiene and 1,3-butadiene.

8. Process according to claim 5, wherein the polymerization is carried out in suspension, in a reaction medium comprised of one of the comonomers, to which a saturated hydrocarbon, or a mixture of different saturated hydrocarbons, liquid under the reaction conditions, having from 2 to 5 carbon atoms is added as a diluent.

9. Process according to claim 1, wherein the polymerization temperature is kept within a range of 0° C. to 60° C.

10. Process according to claim 8, wherein the polymerization temperature is kept within a range of 25° C. to 55° C.

11. Process according to claim 1, wherein the polymerization is carried out in the presence of hydrogen as a molecular weight moderator and regulator, operating under a total pressure of 5 to 50 bar, with a ratio between the ethylene pressure and the hydrogen pressure higher than 4.

12. Process according to claim 1, wherein the support of magnesium chloride, used in step (i), has an apparent density of 0.30–0.46 g/ml, a granule size of 1–100 μm (average size 10–20 μm), a surface area of 12–17 m$^2$/g, a total porosity of 65–85 volume %.

13. Process according to claim 1, wherein the titanium tetra-alkoxide used in step (i) is selected from titanium tetra n-propoxide, titanium tetra n-butoxide, titanium tetra i-propoxide and titanium tetra i-butoxide.

14. Process according to claim 13, wherein the titanium tetra-alkoxide is titanium tetra n-butoxide.

15. Process according to any of the previous claims, wherein the aliphatic alcohol R'—OH used in step (i) is selected from methanol, ethanol, propanol, isopropanol, n-butanol and n-pentanol.

16. Process according to claim 15, wherein the aliphatic alcohol R'—OH is n-butanol.

17. Process according to claim 1, wherein in step (i) a molar ratio R'—OH/MgCl$_2$ of 1.5:1 and a molar ratio MgCl$_2$/Ti(OR)$_4$ of 1:1 are used.

18. Process according to claim 1, wherein the granular solid obtained in step (ii) is comprised of granules having a size ranging from 10 to 100 μm, an apparent density of 0.45 to 0.50 g/ml, a surface area of 7–10 m$^2$/g, a porosity of 55–70 volume % and with a content of alcohol hydroxyls of 60–65% by weight as R'—OH alcohol and 1–5% by weight as ethanol.

19. A process according to claim 18, wherein the granules have an average size of 30–45 microns.

20. Process according to claim 1, wherein step (iii) is carried out at a temperature ranging from room temperature to 80° C., for a period ranging from 30 to 120 minutes.

21. Process according to claim 1, wherein in step (iii) the ratio between the chlorine atoms, in said alkyl aluminum chloride, and the total alkoxy groups is 0.65:1, the alkyl aluminum chloride, is added to the suspension kept at a temperature of 30°–35° C. and the resulting suspension is then heated to 60° C. for 1 hour.

22. A process according to claim 21, wherein the alkyl aluminum chloride is diluted in a hydrocarbon solvent.

23. Process according to claim 1, wherein the solid component of catalyst is a spherical granular solid, with a granule size of 1 to 30 μm, a surface area of 10–20 m$^2$/g, a porosity of 65–85 volume %, an apparent density of 0.4–0.5 g/ml, and with the following composition expressed in atomic proportions:

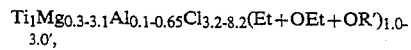

$$Ti_1Mg_{0.3-3.1}Al_{0.1-0.65}Cl_{3.2-8.2}(Et+OEt+OR')_{1.0-3.0'},$$

wherein R' is a linear or branched alkyl radical, containing from 1 to 5 carbon atoms and the titanium is partly in a trivalent form and partly in a tetravalent form, with a ratio between the trivalent titanium and the total titanium of 0.6:1 to 1:1.

24. A process according to claim 23, wherein the granules have an average size of 7–15 microns.

25. Process according to claim 1, wherein an atomic ratio between the aluminum and the titanium of 5:1 to 400:1 is maintained in the Ziegler-Natta catalyst.

26. Process according to claim 1, wherein the alkyl of the aluminum trialkyl contains from 2 to 6 carbon atoms.

27. Process according to claim 26, wherein the aluminum trialkyl is aluminum tributyl.

* * * * *

UNITED STATES PATENT AND TRADEMARK OFFICE
CERTIFICATE OF CORRECTION

PATENT NO. : 5,374,695
DATED : December 20, 1994
INVENTOR(S) : Tiziano Tanaglia et al.

It is certified that error appears in the above-indentified patent and that said Letters Patent is hereby corrected as shown below:

Col. 8, line 60,
In Claim 1, in subparagraph (iii) after the word "sesquichloride" the --"-- should be deleted.

Col. 9, line 9,
   In claim 8, "5" should be deleted and --1-- should be inserted.

Signed and Sealed this

Fifth Day of December, 1995

Attest:

BRUCE LEHMAN

Attesting Officer

Commissioner of Patents and Trademarks